United States Patent
Liang et al.

(10) Patent No.: US 10,965,798 B2
(45) Date of Patent: Mar. 30, 2021

(54) TOUCHSCREEN AND TERMINAL DEVICE WITH TOUCHSCREEN

(71) Applicant: Huawei Technologies Co., Ltd., Shenzhen (CN)

(72) Inventors: Yanfeng Liang, Shanghai (CN); Chunlang Pu, Shanghai (CN); Jianbo Ye, Shanghai (CN); Yong Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 16/473,520

(22) PCT Filed: Mar. 27, 2017

(86) PCT No.: PCT/CN2017/078275
§ 371 (c)(1),
(2) Date: Jun. 25, 2019

(87) PCT Pub. No.: WO2018/120469
PCT Pub. Date: Jul. 5, 2018

(65) Prior Publication Data
US 2020/0104011 A1 Apr. 2, 2020

(30) Foreign Application Priority Data
Dec. 26, 2016 (CN) .......................... 201611219943.9

(51) Int. Cl.
*H04M 1/02* (2006.01)
*G06F 3/044* (2006.01)
*G06F 3/041* (2006.01)

(52) U.S. Cl.
CPC ........ *H04M 1/0266* (2013.01); *G06F 3/0412* (2013.01); *G06F 3/0443* (2019.05);
(Continued)

(58) Field of Classification Search
CPC .. G06F 3/0445; G06F 3/0446; G06F 3/04164; G06F 3/0443
See application file for complete search history.

(56) References Cited

U.S. PATENT DOCUMENTS 8,692,776 B2   4/2014 Yousefpor et al.
2013/0141343 A1  6/2013 Yu et al.
(Continued)

FOREIGN PATENT DOCUMENTS

CN   102360145 A   2/2012
CN   202205184 U   4/2012
(Continued)

OTHER PUBLICATIONS

Machine Translation and Abstract of Chinese Publication No. CN102360145, Feb. 22, 2012, 20 pages.
(Continued)

*Primary Examiner* — Kent W Chang
*Assistant Examiner* — Chayce R Bibbee
(74) *Attorney, Agent, or Firm* — Conley Rose, P.C.

(57) ABSTRACT

A touchscreen includes a touch drive electrode, a touch sensing electrode, a touch drive circuit, a gate drive circuit, a touch drive electrode lead, and a liquid crystal panel. The touch drive electrode extends along a first direction. The touch drive circuit is disposed in a non-display area of the touchscreen, and an extension direction of the touch drive circuit is parallel to an extension direction of the touch drive electrode. The extension direction of the touch drive circuit is the same as the extension direction of the touch drive electrode. Each touch drive electrode is connected to the touch drive circuit using a touch drive electrode lead. The touch drive electrode lead is disposed in an area in which a gate drive circuit is located. The touch drive electrode lead
(Continued)

and the gate drive circuit are disposed in an overlapping manner and are isolated from each other.

20 Claims, 7 Drawing Sheets

(52) U.S. Cl.
CPC .......... *G06F 3/0445* (2019.05); *G06F 3/0446* (2019.05); *G06F 3/04164* (2019.05); *H04M 2201/38* (2013.01)

(56) References Cited

U.S. PATENT DOCUMENTS

| | | | |
|---|---|---|---|
| 2014/0048854 | A1 | 2/2014 | Wang et al. |
| 2014/0132534 | A1 | 5/2014 | Kim |
| 2014/0306921 | A1 | 10/2014 | Ningrat |
| 2016/0034070 | A1 | 2/2016 | Hayashi |
| 2016/0195972 | A1 | 7/2016 | Chen et al. |
| 2016/0259460 | A1 | 9/2016 | Yang et al. |
| 2017/0147127 | A1 | 5/2017 | Sun |

FOREIGN PATENT DOCUMENTS

| | | |
|---|---|---|
| CN | 102830879 A | 12/2012 |
| CN | 103150047 A | 6/2013 |
| CN | 103500039 A | 1/2014 |
| CN | 103809316 A | 5/2014 |
| CN | 203706173 U | 7/2014 |
| CN | 104657016 A | 5/2015 |
| CN | 105244005 A | 1/2016 |
| CN | 205540655 U | 8/2016 |
| JP | 2008096614 A | 4/2008 |

OTHER PUBLICATIONS

Machine Translation and Abstract of Japanese Publication No. JP2008096614, Apr. 24, 2008, 13 pages.
Foreign Communication From a Counterpart Application, Chinese Application No. 201780004319.3, Chinese Office Action dated Sep. 27, 2019, 9 pages.
Machine Translation and Abstract of Chinese Publication No. CN104657016, May 27, 2015, 19 pages.
Machine Translation and Abstract of Chinese Publication No. CN202205184, Apr. 25, 2012, 7 pages.
Machine Translation and Abstract of Chinese Publication No. CN203706173, Jul. 9, 2014, 12 pages.
Machine Translation and Abstract of Chinese Publication No. CN205540655, Aug. 31, 2016, 12 pages.
Foreign Communication From a Counterpart Application, PCT Application No. PCT/CN2017/078275, English Translation of International Search Report dated Sep. 11, 2017, 2 pages.
Foreign Communication From a Counterpart Application, PCT Application No. PCT/CN2017/078275, English Translation of Written Opinion dated Sep. 11, 2017, 3 pages.

TOUCHSCREEN AND TERMINAL DEVICE WITH TOUCHSCREEN

CROSS-REFERENCE RELATED APPLICATIONS

This application is a U.S. National Stage of International Patent Application No. PCT/CN2017/078275 filed on Mar. 27, 2017, which claims priority to Chinese Patent Application No. 201611219943.9 filed on Dec. 26, 2016. Both of the aforementioned applications are hereby incorporated by reference in their entireties.

TECHNICAL FIELD

This application relates to the field of touch technologies, and in particular, to a touchscreen and a terminal device with a touchscreen.

BACKGROUND

With development of touchscreen technologies, a capacitive touchscreen is widely applied to an intelligent electronic device. An embedded capacitive touchscreen is a touchscreen obtained when a touch layer is disposed on a display panel.

The capacitive touchscreen works through current induction of a human body. FIG. 1 is a schematic structural diagram of a principle of a conventional embedded capacitive touchscreen. The embedded capacitive touchscreen includes a touch drive electrode 101 and a touch sensing electrode 102 that are isolated from each other. Capacitance Ctp is formed between two electrodes. When a conductor (for example, a hand) touches the capacitive touchscreen, the capacitance changes, and a touch detection apparatus identifies a touch position based on the change of the capacitance.

As shown in FIG. 1, the touch drive electrode 101 extends along a first direction (the first direction shown in FIG. 1 is horizontal), and a touch drive circuit 103 is disposed on two sides of the touch drive electrode. To be specific, the touch drive circuit is perpendicular to the touch drive electrode 101, and is parallel to a gate drive circuit 104. Both the touch drive circuit 103 and the gate drive circuit 104 have a specific width, and a width range belongs to a non-display area of the touchscreen. Consequently, a width of the non-display area of the capacitive touchscreen is relatively wide.

SUMMARY

This application provides a touchscreen and a terminal device with a touchscreen, so as to resolve a technical problem that a conventional embedded capacitive touchscreen has a relatively wide frame. The technical solutions provided in this application are as follows:

According to a first aspect, this application provides a touchscreen, including a touch drive electrode, a touch sensing electrode, a touch drive circuit, a gate drive circuit, a touch drive electrode lead, and a liquid crystal panel. The touch drive electrode is disposed on the liquid crystal panel, and the touch drive electrode extends along a first direction. The touch sensing electrode is disposed on the liquid crystal panel, the touch sensing electrode extends along a second direction, and the second direction is perpendicular to the first direction. The gate drive circuit is disposed in a non-display area of the touchscreen, and the gate drive circuit extends along the second direction. The touch drive circuit is disposed in the non-display area of the touchscreen, the touch drive circuit extends along the first direction, and the touch drive electrode is electrically connected to the touch drive circuit by using the touch drive electrode lead. The touch drive electrode lead and the gate drive circuit are disposed in an overlapping manner in a thickness direction of a lower glass substrate, and the touch drive electrode lead and the gate drive circuit are isolated from each other.

In the touchscreen provided in the first aspect, the touch drive electrode horizontally extends, the touch drive circuit is disposed in the non-display area of the touchscreen, an extension direction of the touch drive circuit is parallel to an extension direction of the touch drive electrode, and the touch drive electrode is electrically connected to the touch drive electrode by using the touch drive electrode lead. To reduce a width of the non-display area of the touchscreen, the touch drive electrode lead and the gate drive circuit are disposed in an overlapping manner, and are isolated from each other, so that a width that needs to be occupied by the touch drive electrode lead is saved. Therefore, the width of the non-display area of the touchscreen is reduced, and the touchscreen has a narrow frame.

In a first possible implementation of the first aspect, the liquid crystal panel includes an upper glass substrate, a liquid crystal layer, and the lower glass substrate. The touch drive electrode is disposed on the lower glass substrate, the touch sensing electrode is disposed on the upper glass substrate, and the touch drive electrode and the touch sensing electrode are isolated from each other.

In a second possible implementation of the first aspect, the liquid crystal panel includes an upper glass substrate, a liquid crystal layer, and the lower glass substrate. Both the touch drive electrode and the touch sensing electrode are disposed on a same plane of the lower glass substrate, and the touch drive electrode and the touch sensing electrode are isolated from each other.

In a third possible implementation of the first aspect, the touch sensing electrode is a strip electrode and extends along the second direction, and the touch sensing electrode is disposed on the lower glass substrate. The touch drive electrode is a touch drive electrode array including a plurality of touch drive electrode blocks, one touch sensing electrode is disposed between two adjacent columns of touch drive electrode blocks, and each row of touch drive electrode blocks are electrically connected to each other.

According to a second aspect, an embodiment of this application provides a touchscreen, including a touch drive electrode, a touch sensing electrode, a touch drive circuit, an induction processing circuit, a touch sensing electrode lead, and a liquid crystal panel. The liquid crystal panel includes an upper glass substrate, a liquid crystal layer, and a lower glass substrate. The touch drive electrode is disposed on the lower glass substrate, and the touch drive electrode extends along a first direction. The touch drive circuit is disposed in a non-display area of the touchscreen, the touch drive circuit extends along a second direction, the touch drive circuit is electrically connected to the touch drive electrode, and the second direction is perpendicular to the first direction. The touch sensing electrode is disposed on a surface that is of the upper glass substrate and that faces the liquid crystal layer, and the touch sensing electrode extends along the second direction. The induction processing circuit is disposed in the non-display area of the touchscreen, and the touch sensing electrode is electrically connected to the induction processing circuit by using the touch sensing electrode lead. The touch sensing electrode lead and the touch sensing electrode are located on a same surface of the upper glass substrate.

In the touchscreen provided in the second aspect, the touch drive electrode is vertically disposed on a lower glass substrate, and an extension direction of the touch drive circuit is perpendicular to an extension direction of the touch drive electrode. Therefore, a lead between the touch drive electrode and the touch drive circuit may be ignored, and a width that needs to be occupied by the touch drive circuit in the non-display area of the touchscreen is saved, thereby reducing a width of the non-display area of the touchscreen. In addition, the touch sensing electrode and the touch sensing electrode lead are disposed on an inner surface of the upper glass substrate, that is, the surface that is of the upper glass substrate and that faces the liquid crystal layer. In this way, the touch sensing electrode lead is prevented from being scratched in a process of manufacturing the touchscreen, thereby ensuring touch precision of an embedded capacitive touchscreen.

According to a third aspect, an embodiment of this application further provides a terminal device with a touchscreen, including a touchscreen and a processor electrically connected to the touchscreen. The processor is configured to: respond to a touch operation detected by the touchscreen, and send to-be-displayed information to the touchscreen. The touchscreen includes a touch drive electrode, a touch sensing electrode, a touch drive circuit, a gate drive circuit, a touch drive electrode lead, and a liquid crystal panel. The touch drive electrode is disposed on the liquid crystal panel, and the touch drive electrode extends along a first direction. The touch sensing electrode is disposed on the liquid crystal panel, the touch sensing electrode extends along a second direction, and the second direction is perpendicular to the first direction. The gate drive circuit is disposed in a non-display area of the touchscreen, and the gate drive circuit extends along the second direction. The touch drive circuit is disposed in the non-display area of the touchscreen, the touch drive circuit extends along the first direction, and the touch drive electrode is electrically connected to the touch drive circuit by using the touch drive electrode lead. The touch drive electrode lead and the gate drive circuit are disposed in an overlapping manner in a thickness direction of a lower glass substrate, and the touch drive electrode lead and the gate drive circuit are isolated from each other.

In the terminal device with a touchscreen provided in the third aspect, an embedded capacitive touchscreen with a narrower frame is used, so that a width of the terminal device can be narrower.

In a first possible implementation of the third aspect, the liquid crystal panel includes an upper glass substrate, a liquid crystal layer, and the lower glass substrate. The touch drive electrode is disposed on the lower glass substrate, the touch sensing electrode is disposed on the upper glass substrate, and the touch drive electrode and the touch sensing electrode are isolated from each other.

In a second possible implementation of the third aspect, the liquid crystal panel includes an upper glass substrate, a liquid crystal layer, and the lower glass substrate. Both the touch drive electrode and the touch sensing electrode are disposed on a same plane of the lower glass substrate, and the touch drive electrode and the touch sensing electrode are isolated from each other.

In a third possible implementation of the third aspect, the touch sensing electrode is a strip electrode and extends along the second direction, and the touch sensing electrode is disposed on the lower glass substrate. The touch drive electrode is a touch drive electrode array including a plurality of touch drive electrode blocks, one touch sensing electrode is disposed between two adjacent columns of touch drive electrode blocks, and each row of touch drive electrode blocks are electrically connected to each other.

According to a fourth aspect, this application further provides a terminal device with a touchscreen, including a touchscreen and a processor electrically connected to the touchscreen. The processor is configured to: respond to a touch operation detected by the touchscreen, and send to-be-displayed information to the touchscreen. The touchscreen includes a touch drive electrode, a touch sensing electrode, a touch drive circuit, an induction processing circuit, a touch sensing electrode lead, and a liquid crystal panel. The liquid crystal panel includes an upper glass substrate, a liquid crystal layer, and a lower glass substrate. The touch drive electrode is disposed on the lower glass substrate, and the touch drive electrode extends along a first direction. The touch drive circuit is disposed in a non-display area of the touchscreen, the touch drive circuit extends along a second direction, the touch drive circuit is electrically connected to the touch drive electrode, and the second direction is perpendicular to the first direction. The touch sensing electrode is disposed on a surface that is of the upper glass substrate and that faces the liquid crystal layer, and the touch sensing electrode extends along the second direction. The induction processing circuit is disposed in the non-display area of the touchscreen, and the touch sensing electrode is electrically connected to the induction processing circuit by using the touch sensing electrode lead. The touch sensing electrode lead and the touch sensing electrode are located on a same surface of the upper glass substrate.

In the terminal device with a touchscreen provided in the fourth aspect, the touch drive electrode of the touchscreen of the terminal device is vertically disposed on a lower glass substrate, and an extension direction of the touch drive circuit is perpendicular to an extension direction of the touch drive electrode. Therefore, a lead between the touch drive electrode and the touch drive circuit may be ignored, and a width that needs to be occupied by the touch drive circuit in the non-display area of the touchscreen is saved, thereby reducing a frame width of the touchscreen. In addition, the touch sensing electrode and the touch sensing electrode lead are disposed on an inner surface of the upper glass substrate, that is, the surface that is of the upper glass substrate and that faces the liquid crystal layer. In this way, the touch sensing electrode lead is prevented from being scratched in a process of manufacturing the touchscreen, thereby ensuring touch precision of an embedded capacitive touchscreen.

BRIEF DESCRIPTION OF DRAWINGS

FIG. 3b is a locally enlarged schematic diagram of an area B in FIG. 3a;

FIG. 5b is a locally enlarged schematic diagram of an area D in FIG. 5a;

DESCRIPTION OF EMBODIMENTS

In a conventional embedded capacitive touchscreen, a touch drive electrode horizontally extends, a touch drive circuit is disposed in a non-display area of the touchscreen, and an extension direction of the touch drive circuit is perpendicular to an extension direction of the touch drive electrode. In addition, a gate drive circuit is also disposed in the non-display area of the touchscreen, and an extension direction of the gate drive circuit is perpendicular to the extension direction of the touch drive electrode. Because both the touch drive circuit and the gate drive circuit have a specific width, a frame width of the capacitive touchscreen is relatively wide and cannot be narrowed. Consequently a total width of the capacitive touchscreen is affected. For the foregoing phenomenon, an embodiment of this application provides an embedded capacitive touchscreen. A touch drive electrode horizontally extends, a touch drive circuit is disposed in a non-display area of the touchscreen, and an extension direction of the touch drive circuit is parallel to an extension direction of the touch drive electrode. The touch drive circuit s electrically connected to the touch drive electrode by using a corresponding touch drive electrode lead. The touch drive electrode lead and a gate drive circuit are disposed in an overlapping manner in a thickness direction of the touchscreen, and the touch drive electrode lead and the gate drive circuit are isolated from each other. In this case, widths of the touch drive electrode lead and the gate drive circuit are equal to a width of the gate drive circuit, thereby saving a width that needs to be occupied by the touch drive electrode lead, and reducing a width of the non-display area of the touchscreen. Therefore, a frame of the capacitive touchscreen is narrower.

Figure 1:
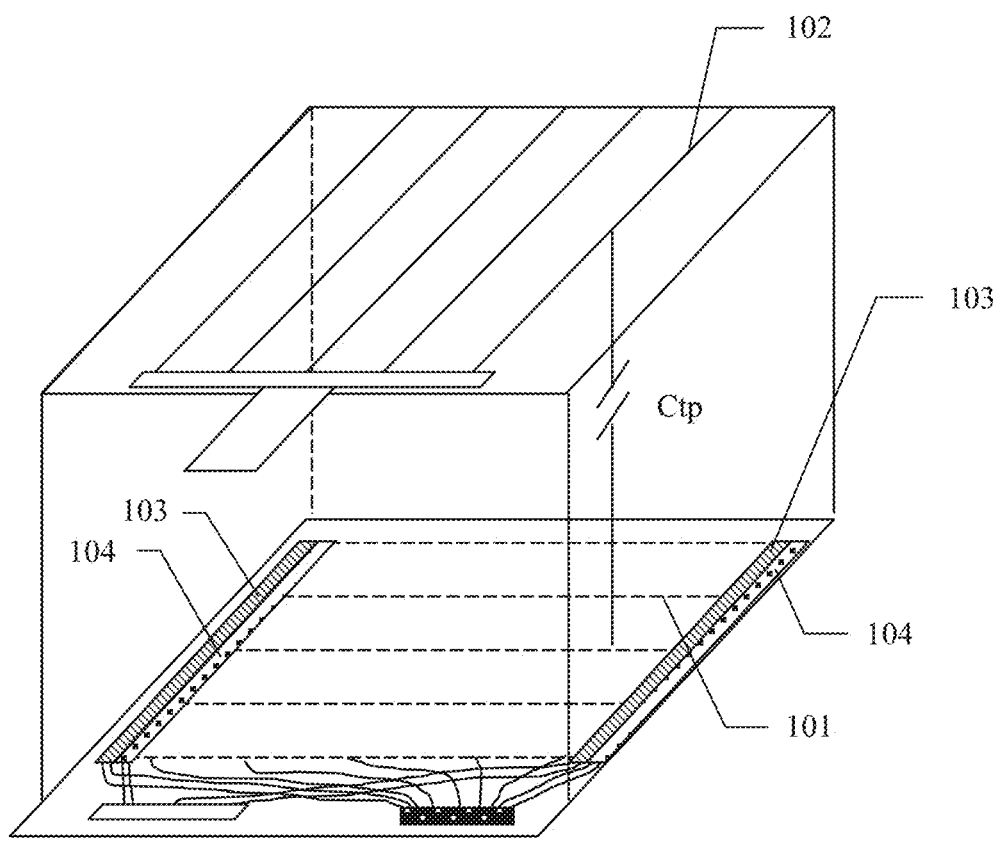
FIG. 1 is a schematic structural diagram of an embedded capacitive touchscreen in a conventional technology.
Figure 2:
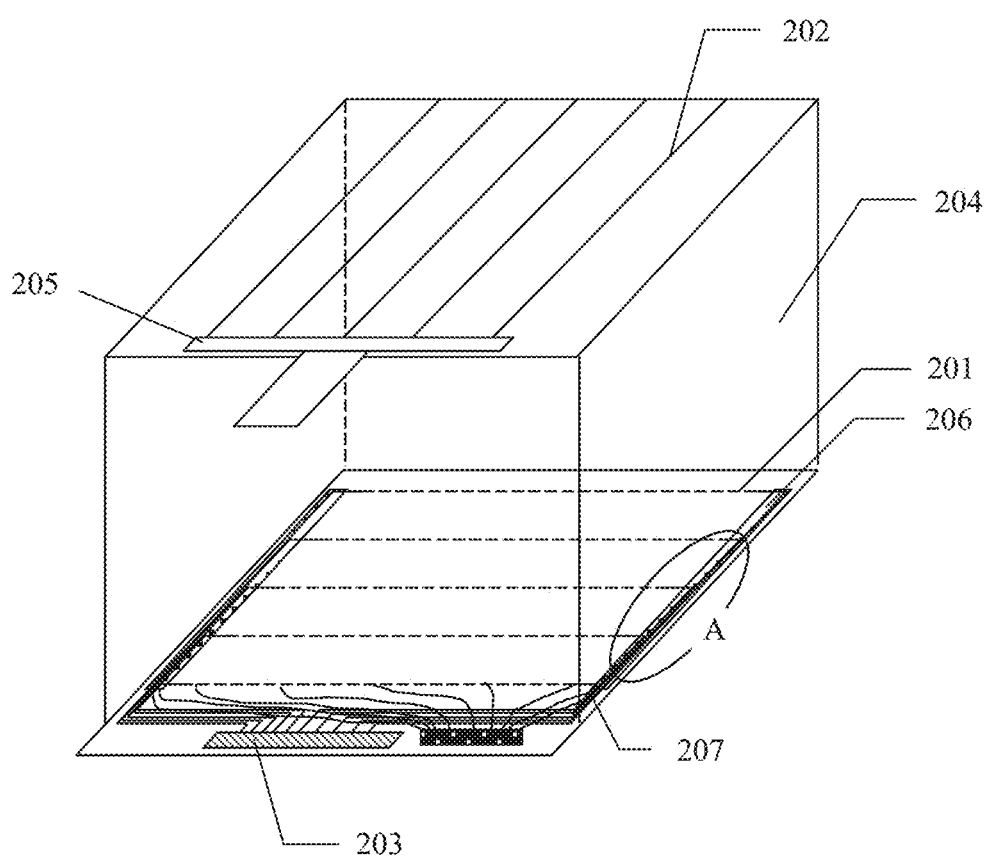
FIG. 2 is a schematic structural diagram of an embedded capacitive touchscreen according to an embodiment of this application.

Referring to FIG. 2, FIG. 2 is a schematic structural diagram of a touchscreen according to an embodiment of this application. The touchscreen in this embodiment is an embedded capacitive touchscreen.

As shown in FIG. 2, the embedded capacitive touchscreen includes a touch drive electrode layer 201, a touch sensing electrode layer 202, a touch drive circuit 203, a liquid crystal panel 204, an induction processing circuit 205, a gate drive circuit 206, and a touch drive electrode lead 207. The liquid crystal panel 204 successively includes an upper glass substrate, a liquid crystal layer, and a lower glass substrate.

The touch sensing electrode layer 202 is disposed on the upper glass substrate of the liquid crystal panel 204, and a touch sensing electrode extends along a second direction (the second direction shown in FIG. 2 is vertical).

The induction processing circuit 205 is electrically connected to each touch sensing electrode in the touch sensing electrode layer 202, and is configured to process an electrical signal sensed by the touch sensing electrode, so as to subsequently identify a touch position.

The touch drive electrode layer 201 is disposed on the lower glass substrate of the liquid crystal panel 204, and a touch drive electrode extends along a first direction (the first direction shown in FIG. 2 is horizontal). In addition, the first direction is perpendicular to the second direction.

The touch drive circuit 203 is disposed in a non-display area of the liquid crystal panel 204, and the touch drive circuit 203 extends along the first direction. To be specific, the touch drive circuit and the touch drive electrode are disposed in parallel. The touch drive electrode is electrically connected to the touch drive circuit 203 by using the touch drive electrode lead 207. The touch drive circuit 203 is configured to provide the touch drive electrode with a drive signal.

The gate drive circuit 206 is disposed in the non-display area of the liquid crystal panel 204, and the gate drive circuit 206 extends along the second direction. The gate drive circuit 206 is responsible for turning on and turning off the liquid crystal layer of the liquid crystal panel.

Figure 3A:
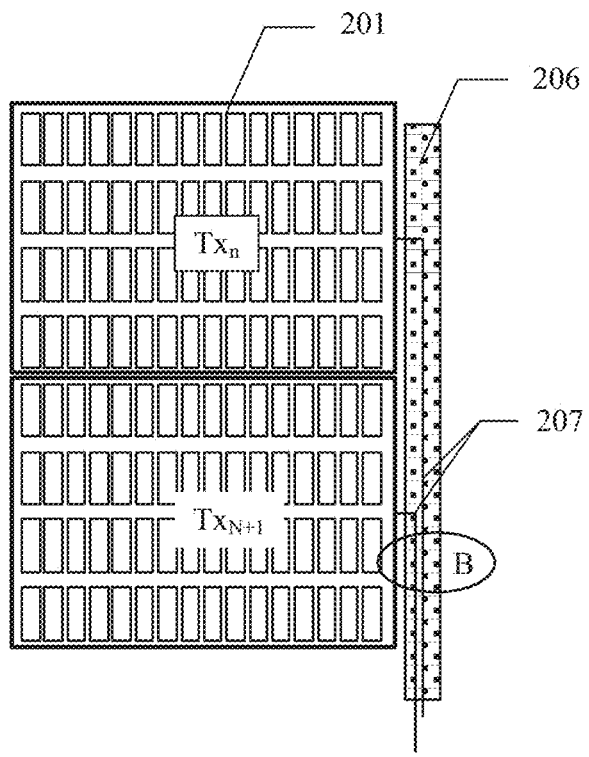
FIG. 3a is a locally enlarged schematic diagram of an area A in FIG. 2.
Figure 3B:
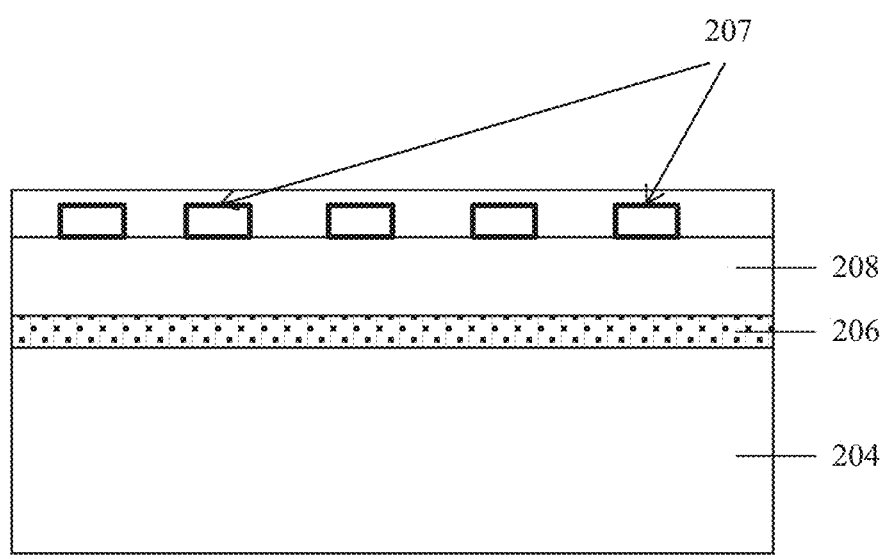

Referring to FIG. 3a and FIG. 3b, the touch drive electrode lead 207 is disposed above the gate drive circuit 206. To be specific, the touch drive electrode lead 207 and the gate drive circuit 206 are overlapped in a thickness direction of the lower glass substrate. In addition, the touch drive electrode lead 207 and the gate drive circuit 206 are isolated from each other. As shown in FIG. 3b, the gate drive circuit 206 and the touch drive electrode lead 207 are isolated from each other by using an insulation layer 208.

In the embedded capacitive touchscreen provided in this embodiment, the touch drive electrode horizontally extends, and the touch drive circuit is disposed in the non-display area of the touchscreen. In addition, an extension direction of the touch drive circuit is parallel to an extension direction of the touch drive electrode. In other words, the extension direction of the touch drive circuit is the same as the extension direction of the touch drive electrode. In this case, each touch drive electrode needs to be connected to the touch drive circuit by using the touch drive electrode lead. To reduce a frame width of the touchscreen, the touch drive electrode lead and the gate drive circuit are disposed in an overlapping manner, and are isolated from each other, so that a width that needs to be occupied by the touch drive electrode lead is saved. Therefore, a width of the non-display area of the embedded touchscreen is reduced, and the touchscreen has a narrow frame.

For a structure in which a touch sensing electrode and a touch drive electrode are disposed on a same plane of a liquid crystal panel, a touchscreen also has a relatively wide frame.

Figure 4:
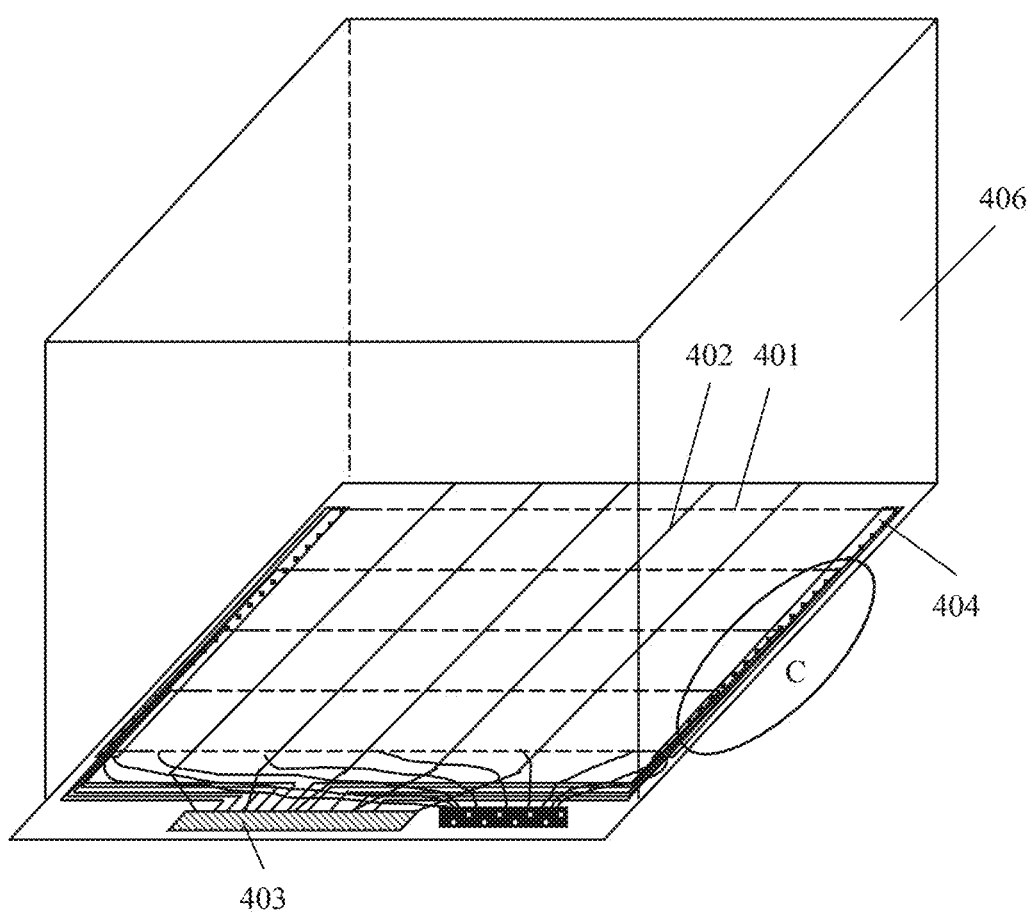
FIG. 4 is a schematic structural diagram of another embedded capacitive touchscreen according to an embodiment of this application.
Figure 5A:
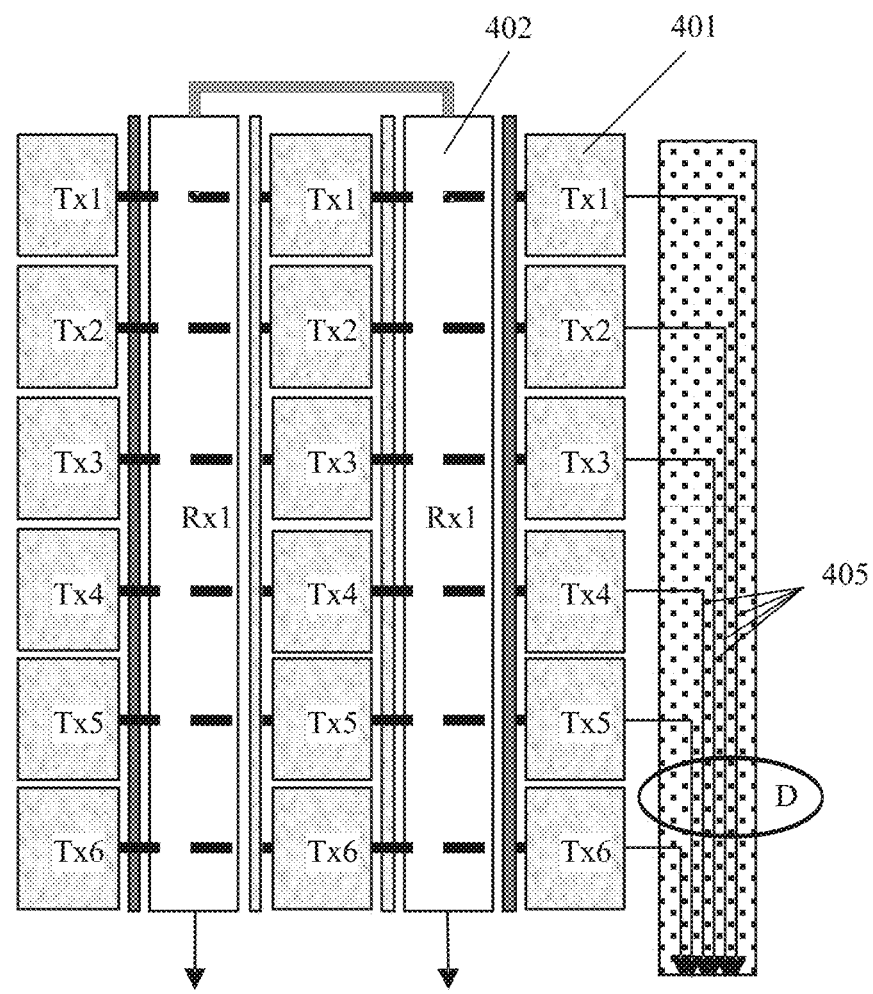
FIG. 5a is a locally enlarged schematic diagram of an area C in FIG. 4.
Figure 5B:
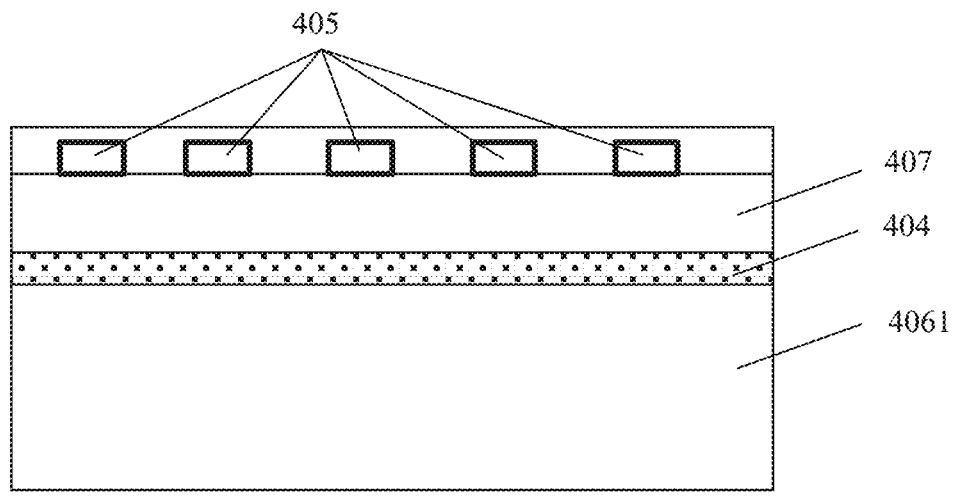

Referring to FIG. 4 to FIG. 5b, FIG. 4 is a schematic structural diagram of another embedded capacitive touchscreen according to an embodiment of this application, FIG. 5a is a locally enlarged schematic diagram of an area C in FIG. 4, and FIG. 5b is a locally enlarged schematic diagram of an area D in FIG. 4. Both a touch sensing electrode and a touch drive electrode of the touchscreen in this embodiment are disposed on a lower glass substrate of a liquid crystal panel.

As shown in FIG. 4, the embedded capacitive touchscreen includes a touch drive electrode 401, a touch sensing electrode 402, a touch drive circuit 403, a gate drive circuit 404, a touch drive electrode lead 405 (shown in FIG. 5a), and a liquid crystal panel 406. The liquid crystal panel 406 successively includes an upper glass substrate, a liquid crystal layer, and a lower glass substrate.

Both the touch drive electrode 401 and the touch sensing electrode 402 are disposed on the lower glass substrate of the liquid crystal panel 406. The touch drive electrode 401 extends along a first direction, and the touch sensing electrode 402 extends along a second direction. The second direction is perpendicular to the first direction. The touch drive electrode 401 and the touch sensing electrode 402 are isolated from each other.

In a possible implementation of this application, as shown in FIG. 5a, the touch drive electrode is an arrayed touch drive electrode including a plurality of touch drive electrode blocks (a touch drive electrode 1, a touch drive electrode 2, a touch drive electrode 3, and the like in FIG. 5a), one touch sensing electrode (the touch sensing electrode is a strip electrode) is disposed between two adjacent columns of touch drive electrode blocks, and each row of touch drive electrode blocks are electrically connected to each other to form one touch drive electrode.

As shown in FIG. 5a, the touch drive electrode 401 is connected to the touch drive circuit 403 (shown in FIG. 4) by using the touch drive electrode lead 405, so that the touch drive circuit 403 provides the touch drive electrode 401 with a drive signal.

As shown in FIG. 5b, the touch drive electrode lead 405 and the gate drive circuit 404 are disposed in an overlapping manner in a thickness direction of a lower glass substrate 4061, and the touch drive electrode lead 405 and the gate drive circuit 404 are isolated from each other. For example, the touch drive electrode lead 405 and the gate drive circuit 404 are isolated from each other by using an insulation layer 407. Because the touch drive electrode lead and the gate drive circuit are disposed in an overlapping manner, a width that needs to be occupied by the touch drive electrode lead is saved, and a width of a non-display area of the embedded capacitive touchscreen is reduced.

In the embedded capacitive touchscreen provided in this embodiment, the touch drive electrode lead and the gate drive circuit are disposed in an overlapping manner in the thickness direction of the lower glass substrate, and the touch drive electrode lead and the gate drive circuit are isolated from each other. In this way, the width that needs to be occupied by the touch drive electrode lead is saved, and therefore the width of the non-display area of the touchscreen is reduced, and a frame of the touchscreen can be narrower.

Figure 6:
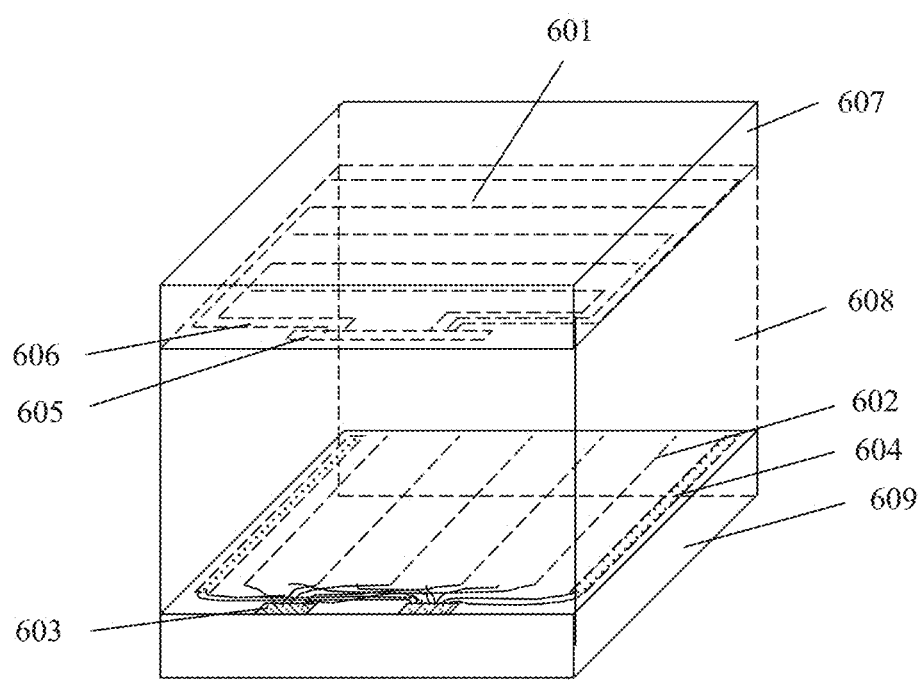
FIG. 6 is a schematic structural diagram of still another embedded capacitive touchscreen according to an embodiment of this application.

Referring to FIG. 6, FIG. 6 is a schematic structural diagram of still another embedded capacitive touchscreen according to an embodiment of this application. In this embodiment, a frame width of the touchscreen is reduced by adjusting an extension direction of a touch drive electrode.

As shown in FIG. 6, the embedded capacitive touchscreen includes a touch sensing electrode layer 601, a touch drive electrode layer 602, a touch drive circuit 603, a gate drive circuit 604, an induction processing circuit 605, a touch sensing electrode lead 606, and a liquid crystal panel. The liquid crystal panel successively includes an upper glass substrate 607, a liquid crystal layer 608, and a lower glass substrate 609.

The touch sensing electrode layer 601 is disposed on an inner surface of the upper glass substrate 607 (that is, a surface that is of the upper glass substrate and that faces the liquid crystal layer). In addition, a touch sensing electrode extends along a second direction (the second direction shown in FIG. 6 is horizontal).

The induction processing circuit 605 is disposed in a non-display area of the touchscreen, and an extension direction of the induction processing circuit is parallel to an extension direction of the touch sensing electrode. The touch sensing electrode is electrically connected to the induction processing circuit 605 by using the touch sensing electrode lead 606, so that the induction processing circuit 605 processes an electrical signal sensed by the touch sensing electrode, so as to subsequently identify a touch position.

The touch sensing electrode lead 606 and the touch sensing electrode layer 601 are located on the inner surface of the upper glass substrate 607. In this way, the touch sensing electrode lead 606 is not scratched in a process of manufacturing the touchscreen, thereby avoiding a touch problem caused when the touch sensing electrode lead 606 is scratched.

The touch drive electrode layer 602 is disposed on the lower glass substrate 607 of the liquid crystal panel, and a touch drive electrode extends along a first direction (the first direction shown in FIG. 6 is vertical). In addition, the touch drive electrode layer 602 and the touch sensing electrode layer 601 are isolated from each other.

The touch drive circuit 603 is disposed in the non-display area of the touchscreen, and the touch drive circuit 603 extends along the second direction. To be specific, the touch drive circuit 603 is perpendicular to the touch drive electrode. Therefore, a lead between the touch drive circuit 603 and the touch drive electrode may be ignored.

In the touchscreen provided in this embodiment, the touch drive electrode vertically extends, and the touch drive circuit 603 is disposed in the non-display area of the touchscreen. In addition, an extension direction of the touch drive circuit is perpendicular to the extension direction of the touch drive electrode, and the lead between the touch drive circuit and the touch drive electrode may be ignored. In this way, a width that needs to be occupied by the touch drive circuit is saved, and a width of the non-display area of the touchscreen is reduced, thereby reducing the frame width of the touchscreen.

In the embedded capacitive touchscreen provided in this embodiment, the touch drive electrode is vertically disposed on a lower glass substrate, and the touch drive circuit is perpendicular to the extension direction of the touch drive electrode. Therefore, the lead between the touch drive electrode and the touch drive circuit may be ignored, and the width that needs to be occupied by the touch drive circuit in the non-display area of the touchscreen is saved, thereby reducing the frame width of the touchscreen. In addition, the touch sensing electrode and the touch sensing electrode lead are disposed on the inner surface of the upper glass substrate, that is, the surface that is of the upper glass substrate and that faces the liquid crystal layer. In this way, the touch sensing electrode lead is prevented from being scratched in the process of manufacturing the touchscreen, thereby ensuring touch precision of the embedded capacitive touchscreen.

Figure 7:
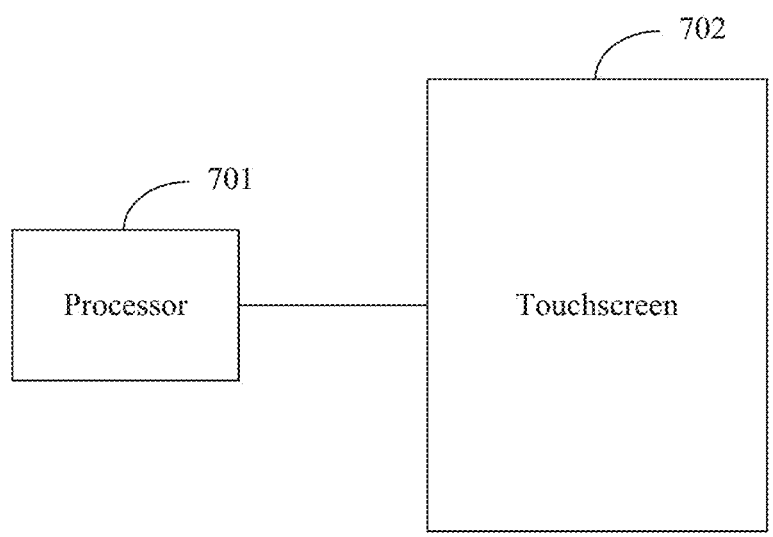
FIG. 7 is a schematic structural diagram of a principle of a terminal device with a touchscreen according to an embodiment of this application.

Referring to FIG. 7. FIG. 7 is a schematic structural diagram of a principle of a terminal device with a touchscreen according to an embodiment of this application. This embodiment is described by using a smartphone with a touchscreen as an example. As shown in FIG. 7, the terminal device includes a processor 701 and a touchscreen 702. The touchscreen 702 is an embedded capacitive touchscreen.

The processor 701 is electrically connected to the touchscreen 702. After detecting a touch operation, the touchscreen provides the processor 701 with the touch operation for subsequent processing. The processor 701 responds to the touch operation based on corresponding processing logic. In addition, the processor 701 sends to-be-displayed data to the touchscreen 702, so that the touchscreen 702 displays the data.

The touchscreen 702 may be any embedded capacitive touchscreen in the embodiments corresponding to FIG. 2 to FIG. 6, and details are not described herein again.

In the terminal device provided in this embodiment, an embedded capacitive touchscreen with a narrower frame is used, so that a width of the terminal device can be narrower.

What is claimed is:

1. A touchscreen, comprising:
a liquid crystal panel;
a touch drive electrode disposed on the liquid crystal panel, wherein the touch drive electrode extends along a first direction;
a touch sensing electrode disposed on the liquid crystal panel, wherein the touch sensing electrode extends along a second direction, and wherein the second direction is perpendicular to the first direction;
a gate drive circuit disposed in a non-display area of the touchscreen, wherein the gate drive circuit extends along the second direction;
a touch drive circuit disposed in the non-display area of the touchscreen, wherein the touch drive circuit extends along the first direction; and
a touch drive electrical lead electrically connecting the touch drive electrode to the touch drive circuit,
wherein the touch drive electrode lead and the gate drive circuit are disposed in an overlapping manner in a thickness direction of a lower glass substrate, and
wherein the touch drive electrode lead and the gate drive circuit are isolated from each other.

2. The touchscreen of claim 1, wherein the liquid crystal panel comprises an upper glass substrate, a liquid crystal layer, and the lower glass substrate, wherein the touch drive electrode is disposed on the lower glass substrate, wherein the touch sensing electrode is disposed on the upper glass substrate, and wherein the touch drive electrode and the touch sensing electrode are isolated from each other.

3. The touchscreen of claim 1, wherein the liquid crystal panel comprises an upper glass substrate, a liquid crystal layer, and the lower glass substrate, wherein both the touch drive electrode and the touch sensing electrode are disposed on a same plane of the lower glass substrate, and wherein the touch drive electrode and the touch sensing electrode are isolated from each other.

4. The touchscreen of claim 3, wherein the touch sensing electrode is a strip electrode and extends along the second direction, wherein the touch sensing electrode is disposed on the lower glass substrate, wherein the touch drive electrode is a touch drive electrode array comprising a plurality of touch drive electrode blocks, wherein one touch sensing electrode is disposed between two adjacent columns of touch drive electrode clocks, and wherein each row of touch drive electrode blocks are electrically connected to each other.

5. A touch screen, comprising:
a liquid crystal panel, wherein the liquid crystal panel comprises an upper glass substrate, a liquid crystal layer, and a lower glass substrate;
a touch drive electrode disposed on the lower glass substrate, wherein the touch drive electrode extends along a first direction;
a touch drive circuit disposed in a non-display area of the touchscreen, wherein the touch drive circuit extends along a second direction, wherein the touch drive circuit is electrically connected to the touch drive electrode, and wherein the second direction is perpendicular to the first direction;
a touch sensing electrode disposed on a surface of the upper glass substrate that faces the liquid crystal layer, and wherein the touch sensing electrode extends along the second direction; and
an induction processing circuit disposed in the non-display area of the touchscreen, wherein the touch sensing electrode is electrically connected to the induction processing circuit using the touch sensing electrode lead, and wherein the touch sensing electrode lead and the touch sensing electrode are located on a same surface of the upper glass substrate.

6. A terminal device comprising:
a touchscreen; and
a processor electrically connected to the touchscreen and configured to:
respond to a touch operation detected by the touchscreen; and
send to-be-displayed information to the touchscreen, and
wherein the touchscreen comprises:
a liquid crystal panel;
a touch drive electrode disposed on the liquid crystal panel, wherein the touch drive electrode extends along a first direction;
a touch sensing electrode disposed on the liquid crystal panel, wherein the touch sensing electrode extends along a second direction, and wherein the second direction is perpendicular to the first direction;
a gate drive circuit disposed in a non-display area of the touchscreen, wherein the gate drive circuit extends along the second direction;
a touch drive circuit disposed in the non-display area of the touchscreen, wherein the touch drive circuit extends along the first direction; and
a touch drive electrode lead electrically connecting the touch drive electrode to the touch drive circuit, and
wherein the touch drive electrode lead and the gate drive circuit are disposed in an overlapping manner in a thickness direction of a lower glass substrate, and
wherein the touch drive electrode lead and the gate drive circuit are isolated from each other.

7. The terminal device of claim 6, wherein the liquid crystal panel comprises an upper glass substrate, a liquid crystal layer, and the lower glass substrate, wherein the touch drive electrode is disposed on the lower glass substrate, wherein the touch sensing electrode is disposed on the upper glass substrate; and wherein the touch drive electrode and the touch sensing electrode are isolated from each other.

8. The terminal device of claim 6, wherein the liquid crystal panel comprises an upper glass substrate, a liquid crystal layer, and the lower glass substrate, wherein both the touch drive electrode and the touch sensing electrode are disposed on a same plane of the lower glass substrate, and wherein the touch drive electrode and the touch sensing electrode are isolated from each other.

9. The terminal device of claim 8, wherein the touch sensing electrode is a strip electrode and extends along the second direction, wherein the touch sensing electrode is disposed on the lower glass substrate, wherein the touch drive electrode is a touch drive electrode array comprising a plurality of touch drive electrode blocks, wherein one touch sensing electrode is disposed between two adjacent columns of touch drive electrode blocks, and wherein each row of touch drive electrode blocks are electrically connected to each other.

10. The terminal device of claim 6, wherein widths of the touch drive electrode lead and the gate drive circuit are equal to a width of the gate drive circuit.

11. The terminal device of claim 10, wherein the touchscreen and the processor are comprised in a smart phone.

12. The terminal device of claim 11, wherein the first direction comprises a horizontal direction of the smart phone.

13. The terminal device of claim 12, wherein the second direction comprises a vertical direction of the smart phone.

14. The terminal device of claim 13, wherein the touch drive circuit is parallel to the touch drive electrode.

15. The terminal device of claim 14, wherein the touch sensing electrode lead and the touch sensing electrode are located on an outer surface of the smart phone.

16. The terminal device of claim 15, wherein the processor comprises processing logic that processes the touch operation and generates the to-be-displayed information.

17. The terminal device of claim 16, wherein the touchscreen is an embedded capacitive touchscreen of the smart phone.

18. The terminal device of claim 17, wherein the touch drive electrode lead and the gate drive circuit are isolated from each other using an insulation layer.

19. The terminal device of claim 18, wherein the touch sensing electrode lead and the touch sensing electrode are located on an inner surface of an upper glass substrate.

20. The terminal device of claim 19, wherein the touch drive electrode lead is disposed on the lower glass substrate of the liquid crystal panel.

\* \* \* \* \*

UNITED STATES PATENT AND TRADEMARK OFFICE
CERTIFICATE OF CORRECTION

PATENT NO. : 10,965,798 B2
APPLICATION NO. : 16/473520
DATED : March 30, 2021
INVENTOR(S) : Yanfeng Liang et al.

Page 1 of 1

It is certified that error appears in the above-identified patent and that said Letters Patent is hereby corrected as shown below:

In the Claims

Claim 4, Column 9, Line 44: "electrode clocks, and wherein" should read "electrode blocks, and wherein"

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*